(12) United States Patent
Kim

(10) Patent No.: US 8,703,312 B2
(45) Date of Patent: Apr. 22, 2014

(54) BATTERY MODULE

(75) Inventor: Myung-Chul Kim, Yongin-si (KR)

(73) Assignees: Samsung SDI Co., Ltd., Yongin-Si, Gyeonggi-Do (KR); Robert Bosch GmbH, Stuttgart (DE)

( * ) Notice: Subject to any disclaimer, the term of this patent is extended or adjusted under 35 U.S.C. 154(b) by 0 days.

(21) Appl. No.: 13/451,990

(22) Filed: Apr. 20, 2012

(65) Prior Publication Data

US 2013/0164599 A1    Jun. 27, 2013

Related U.S. Application Data

(60) Provisional application No. 61/579,791, filed on Dec. 23, 2011.

(51) Int. Cl.
*H01M 2/00* (2006.01)
*H01M 2/04* (2006.01)
*H01M 2/24* (2006.01)

(52) U.S. Cl.
USPC .............. 429/65; 429/158; 429/159; 429/175

(58) Field of Classification Search
None
See application file for complete search history.

(56) References Cited

U.S. PATENT DOCUMENTS

| | | | | |
|---|---|---|---|---|
| 5,278,003 A | * | 1/1994 | Francisco | 429/175 |
| 5,405,716 A | * | 4/1995 | Yoshimatsu et al. | 429/65 |
| 5,695,295 A | * | 12/1997 | Ayele et al. | 402/80 R |
| 5,707,248 A | * | 1/1998 | Matsumura | 439/489 |
| 5,910,029 A | | 6/1999 | Siedlik et al. | |
| 6,340,538 B1 | * | 1/2002 | King | 429/96 |
| 6,428,924 B1 | * | 8/2002 | Suganuma et al. | 429/163 |
| 2004/0099669 A1 | * | 5/2004 | Lown et al. | 220/324 |
| 2005/0250006 A1 | * | 11/2005 | Kim | 429/160 |
| 2006/0251960 A1 | * | 11/2006 | Yoon et al. | 429/120 |
| 2011/0223466 A1 | | 9/2011 | Lee et al. | |
| 2011/0237139 A1 | | 9/2011 | Lee et al. | |

FOREIGN PATENT DOCUMENTS

| | | |
|---|---|---|
| EP | 2337119 A2 | 6/2011 |
| JP | 2012-169256 A | 9/2012 |
| KR | 10 2004-0051170 A | 6/2004 |
| KR | 10 2010-0070170 A | 6/2010 |
| WO | WO 98/35394 A1 | 8/1998 |
| WO | WO 2010/071292 A1 | 6/2010 |
| WO | WO 2012/102373 A1 | 8/2012 |

OTHER PUBLICATIONS

European Search Report in EP 12198096.5-1359, dated Apr. 5, 2013 (Kim).

* cited by examiner

*Primary Examiner* — Ula C. Ruddock
*Assistant Examiner* — Matthew Van Oudenaren
(74) *Attorney, Agent, or Firm* — Lee & Morse, P.C.

(57) ABSTRACT

A battery module including a plurality of battery cells, each of the battery cells including a terminal such that the plurality of battery cells provide a plurality of terminals, wherein a terminal of one of the battery cells is connected to a terminal of an adjacent battery cell with a connecting member; a top plate on the plurality of battery cells, the top plate including an opening corresponding to a position of the terminals connected by the connecting member such that the terminals connected by the connecting member extend therethrough, and a terminal cover detachably covering the opening of the top plate, the terminal cover including a release that selectively detaches the terminal cover from the top plate.

17 Claims, 6 Drawing Sheets

BATTERY MODULE

CROSS-REFERENCE TO RELATED APPLICATION

The present application claims priority under 35 U.S.C. §119(e) to U.S. Provisional Application No. 61/579,791, filed on Dec. 23. 2011, and entitled: "Battery Module," which is incorporated herein by reference in its entirety.

BACKGROUND

1. Field

Embodiments relate to a battery module.

2. Description of the Related Art

Recently, a high output battery module using non-aqueous electrolyte of high energy density has been considered. The high output battery module may include a high capacity battery module formed by serially connecting a plurality of battery cells to be used for driving a device that requires high power, e.g., a motor of an electrical vehicle.

Typically, the battery module may include a plurality of battery cells. The battery cell may provide energy to an external electronic device by an electro-chemical reaction. The plurality of battery cells may be fixed (by a housing) to be used as a power source. The battery cell may include a highly reactive material therein, e.g., lithium. Thus, stability may be important.

SUMMARY

Embodiments are directed to a battery module.

The embodiments may be realized by providing a battery module including a plurality of battery cells, each of the battery cells including a terminal such that the plurality of battery cells provide a plurality of terminals, wherein a terminal of one of the battery cells is connected to a terminal of an adjacent battery cell with a connecting member; a top plate on the plurality of battery cells, the top plate including an opening corresponding to a position of the terminals connected by the connecting member such that the terminals connected by the connecting member extend therethrough, and a terminal cover detachably covering the opening of the top plate, the terminal cover including a release that selectively detaches the terminal cover from the top plate.

The top plate may further include a barrier rib adjacent to the opening and the terminals connected by the connecting member.

The barrier rib may surround the opening.

The terminal cover may include a base unit overlying the opening, and an extending unit extending from the base unit and being detachably coupled with the barrier rib.

The extending unit may include a coupling protrusion thereon, the barrier rib may include a coupling groove thereon, and the coupling protrusion may be detachably coupled with the coupling groove.

The coupling protrusion may include a hook edge extending perpendicularly from the extending unit, the coupling groove may include a hook groove parallel with the hook edge, and the hook edge may be coupled with the hook groove.

The hook edge may have a length, the hook groove may have a depth, and the depth of the hook groove may be greater than the length of the hook edge.

The coupling protrusion may include at least one coupling bump, the coupling groove may include at least one coupling hole, and the at least one coupling bump may be coupled with the at least one coupling hole.

The terminal cover may include a pair of releases, the pair of releases being disposed on opposite ends of the base unit.

The extending unit may include a pair of coupling extending units coupled with the barrier rib, the pair of coupling extending units being connected to respective ones of the pair of releases.

The extending unit may further include a pair of lateral extending units orthogonal to the coupling extending units.

The release may include a slit.

The slit may have a concave shape with a concavity facing the extending unit.

The concave shape may be a polygonal shape.

The concave shape may be an arc shape.

The base unit may have a rectangular shape.

The terminal cover may include a reinforcing rib on an inner surface thereof, the reinforcing rib extending between the release and the extending unit.

The barrier rib may include a reinforcing rib groove, the reinforcing rib groove accommodating the reinforcing rib.

The release may selectively detach the terminal cover from the top plate in response to a predetermined pressure applied to the release.

The terminal cover may include a plurality of through holes therethrough, the through holes overlying the terminals connected by the connecting member.

BRIEF DESCRIPTION OF THE DRAWINGS

Features will become apparent to those of ordinary skill in the art by describing in detail exemplary embodiments with reference to the attached drawings in which.

DETAILED DESCRIPTION

Figure 1:
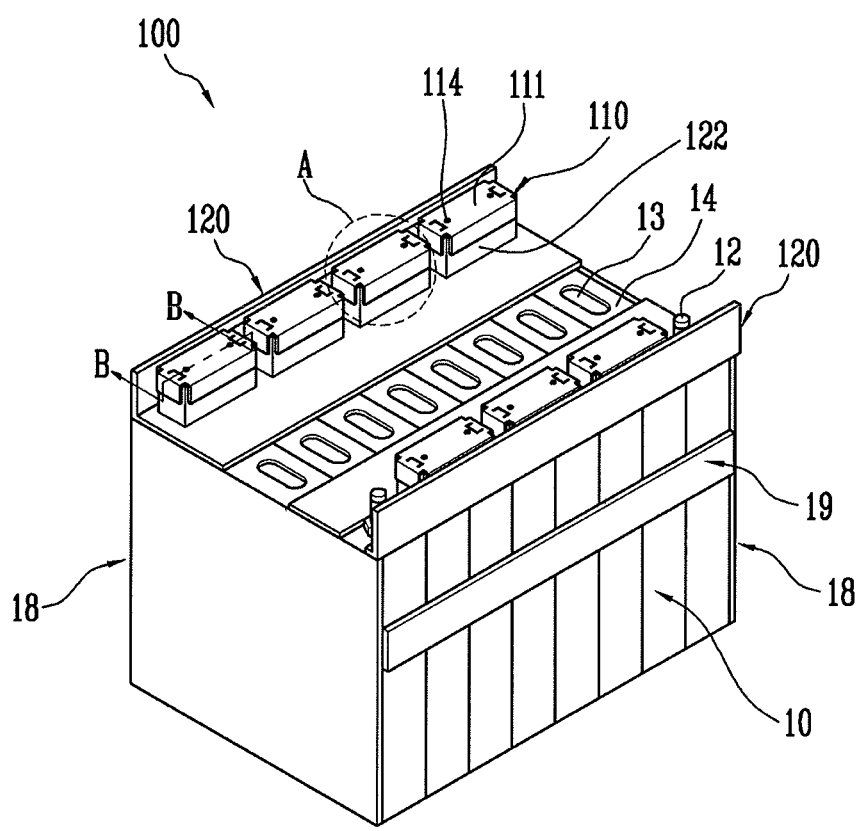
FIG. 1 illustrates a perspective view of a battery module according to an embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer or element is referred to as being "on" another element, it can be directly on the other element, or intervening elements may also be present. In addition, it will also be understood that when an element is referred to as being "between" two elements, it can be the only element between the two elements, or one or more intervening elements may also be present. Like reference numerals refer to like elements throughout.

Figure 2:
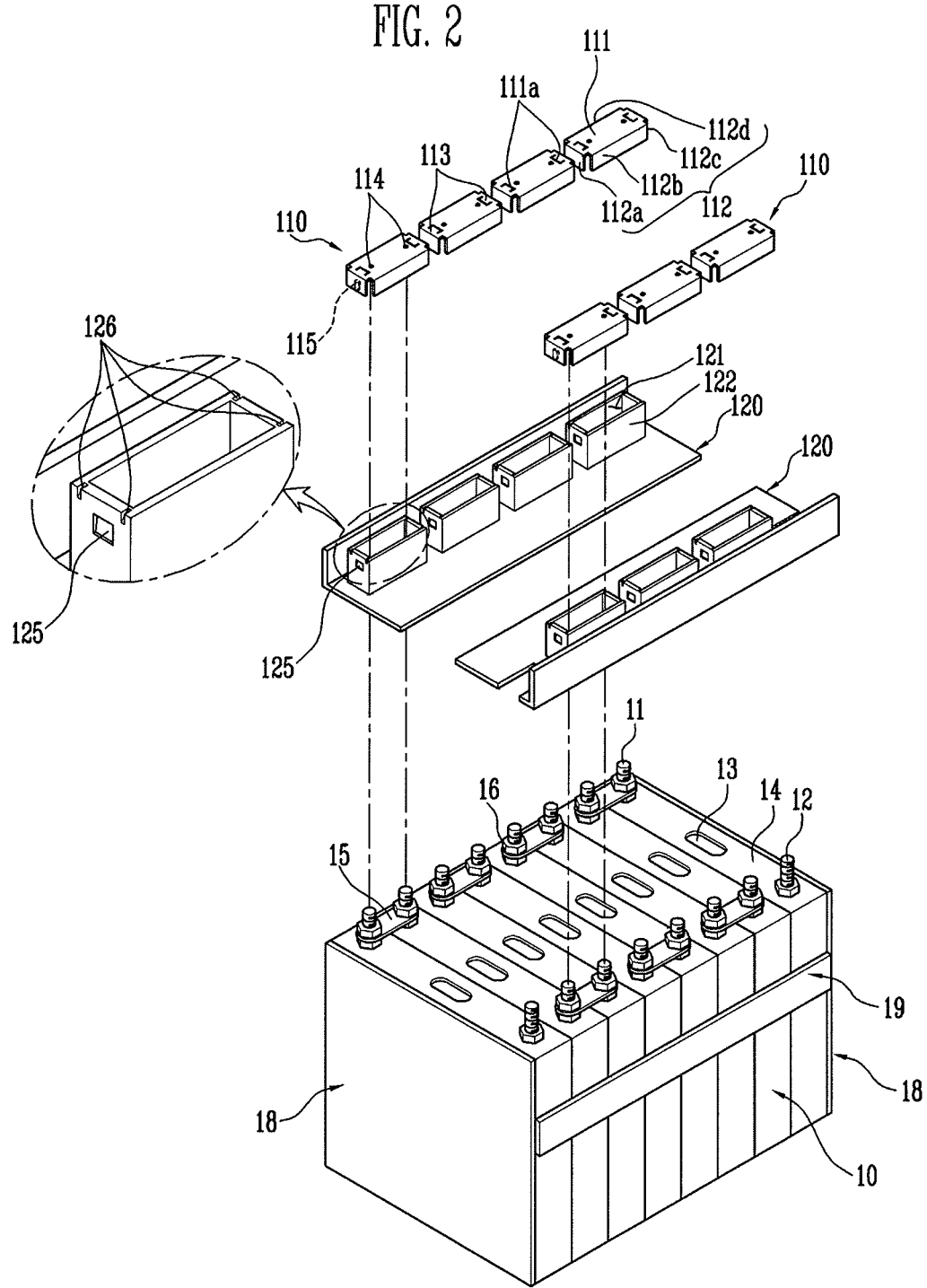
FIG. 2 illustrates an exploded perspective view of the battery module of FIG. 1.

FIG. 1 illustrates a perspective view of a battery module according to an embodiment. FIG. 2 illustrates an exploded perspective view of the battery module of FIG. 1.

A battery module 100 according to the present embodiment may include a plurality of battery cells 10 (including terminal units 11 and 12 on each of first surfaces 14 thereof) arranged in one direction, a terminal unit connecting member 15 (for connecting the terminal units 11 and 12 of adjacent battery cells 10), top plates 120 (on the first surfaces 14 of the battery cells 10 and including at least one opening 121 through which the terminal units 11 and 12 pass or protrude), and terminal covers 110 (corresponding to the openings 121). The top plate 120 may include a barrier rib 122 that protrudes around the opening 121 to surround side surfaces of the terminal units 11 and 12. The terminal cover 110 may overlie at least parts of the barrier ribs 122 to be fastened to or coupled with the barrier rib 122. For example, each of the battery cells 10 may include a terminal unit or terminal 11, 12 such that the plurality of battery cells 10 provide a plurality of terminals 11, 12, wherein a terminal 11, 12 of one of the battery cells 10 is connected to a terminal 11, 12 of an adjacent battery cell 10 with the connecting member 15. The top plate 120 may include an opening corresponding to a position of the terminals 11, 12 connected by the connecting member 15 such that the terminals 11, 12 connected by the connecting member 15 extend therethrough. The terminal cover 110 may detachably cover the opening of the top plate 120, the terminal cover 110 including a reciprocating press unit or release 113 that selectively detaches the terminal cover 110 from the top plate 120. The top plate 120 may include the barrier rib 122 adjacent to the opening and the terminals 11, 12 connected by the connecting member 15. For example, the release 113 may selectively detach the terminal cover 110 from the top plate 120 in response to a predetermined pressure applied to the release 113.

The battery cell 10 may include a battery case having an opening, an electrode assembly accommodated in the battery case, and an electrolyte. The electrode assembly and the electrolyte may electro-chemically react to generate energy. The battery case may be sealed at the first surface 14. For example, the first surface 14 of the battery cell 10 may include a cap assembly. The terminal units 11 and 12 and a vent unit 13 may be provided on the first surface 14. The terminal units 11 and 12 may include a positive terminal 11 and a negative terminal 12 having different polarities. The vent unit 13 (as a safety unit of the battery cell 10) may operate as a channel for discharging gas generated inside of the battery cell 10. In adjacent battery cells 10, the positive terminal 11 and the negative terminal 12 may be electrically connected to each other by the terminal unit connecting member 15. For example, the terminal unit connecting member 15 may include the bus bar and may be fixed to the positive terminal 11 and the negative terminal 12 by a nut 16.

The battery module 100 may include housings 18 and 19 for accommodating the battery cell 10. The housings 18 and 19 may include a pair of end plates 18 and a side plate 19 for connecting the end plates 18. In addition, in the battery module 100, the plurality of battery cells 10 arranged in one direction may be fixed by the pair of end plates 18 and the side plate 19. The pair of end plates 18 may face each other. The pair of end plates 18 may face wide side surfaces of the battery cells 10 to press the battery cells 10 inward. The side plate 19 may fix side surfaces of the battery cells 10. The housing 18 and 19 (for fixing positions of the plurality of battery cells 10) may be variously formed in accordance with a design of the battery module 100.

The battery module 100 may further include the top plate 120 on the first surface 14 of the battery cell 10. The openings 121 (through which the positive terminal 11 and the negative terminal 12 pass) and the barrier rib 122 may be on the top plate 120. The barrier rib 122 may be on the top plate 120 and may protrude outwardly from or around the opening 121. In addition, the barrier rib 122 may surround side surfaces of the positive terminal 11 and the negative terminal 12. The barrier rib 122 may be fastened to the terminal cover 110, and the terminal cover 110 may overlap or overlie at least parts of the barrier rib 122. The barrier rib 122 may surround the opening.

Figure 3:
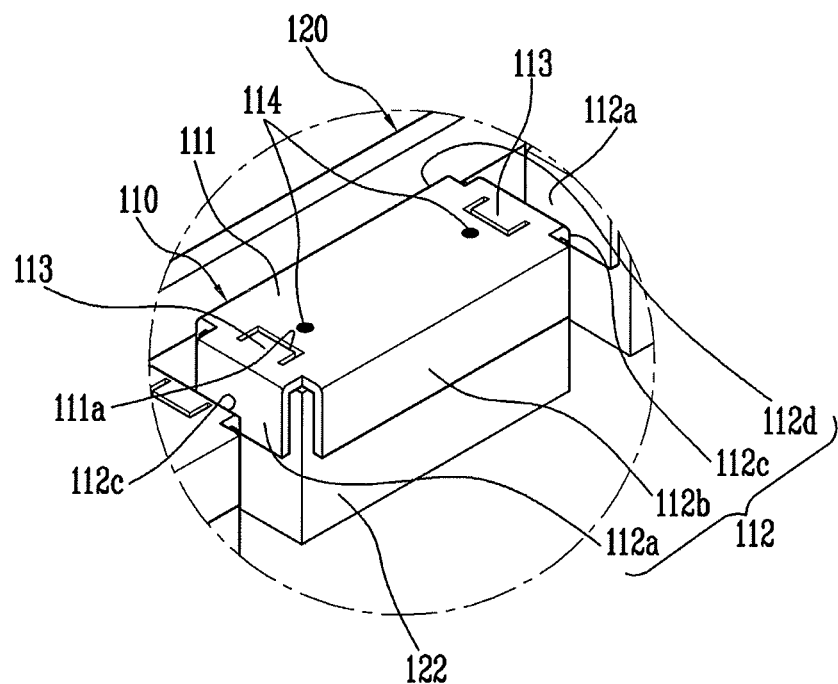
FIG. 3 illustrates an enlarged view of part A of FIG. 1.
Figure 4A:
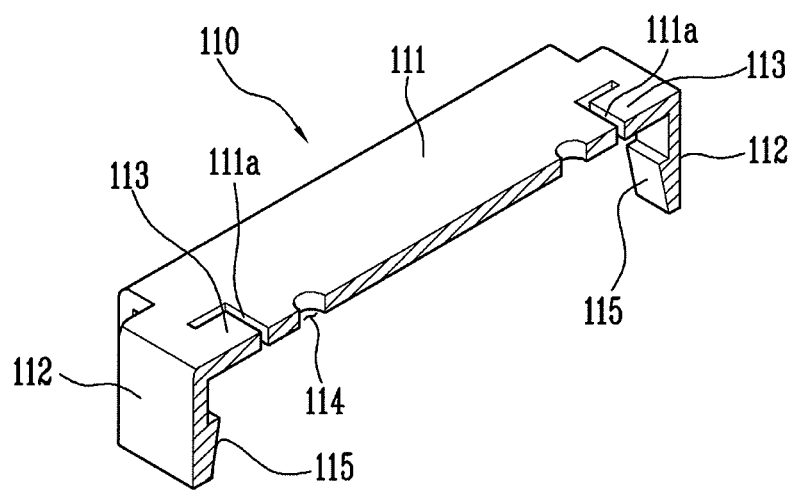
FIG. 4A illustrates a partial perspective view of a terminal cover of the battery module of FIG. 1.
Figure 4B:
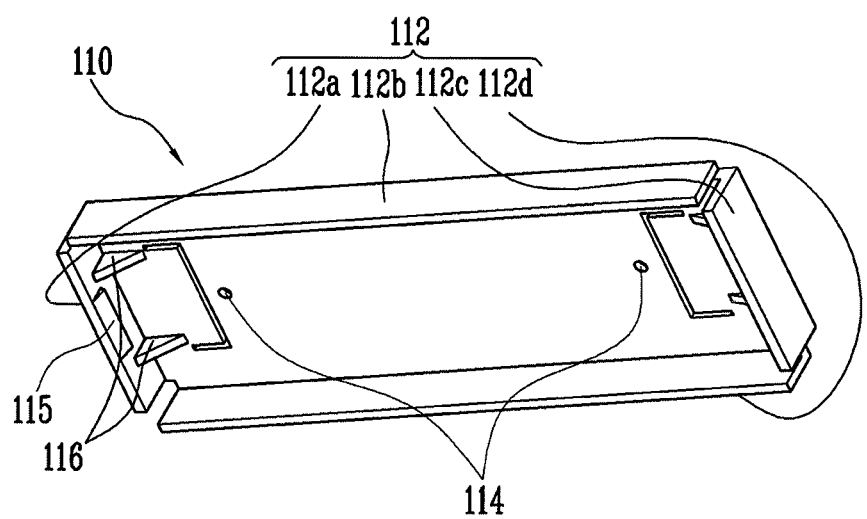
FIG. 4B illustrates a perspective view of an inside of a terminal cover of the battery module of FIG. 1.
Figure 4C:
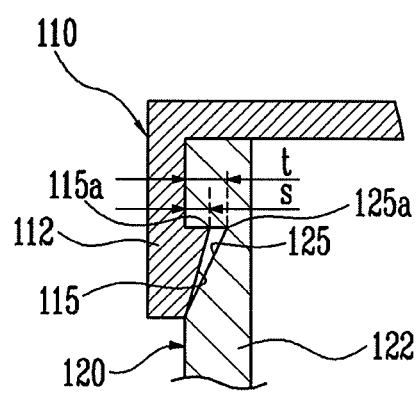
FIG. 4C illustrates a partial sectional view taken along the line B-B of FIG. 1.

FIG. 3 illustrates an enlarged view of part A of FIG. 1. FIG. 4A illustrates a partial perspective view of a terminal cover of the battery module of FIG. 1. FIG. 4B illustrates a perspective view of an inside of a terminal cover of the battery module of FIG. 1. FIG. 4C illustrates a partial sectional view taken along the line B-B of FIG. 1.

Referring to FIGS. 3 and 4C, the terminal cover 110 may include a base unit 111 (facing the terminal unit connecting member 15 and/or overlying the opening) and at least one extending unit 112 (extending from the base unit 111 to be detachably coupled with the barrier rib 122 of the top plate 120). In an implementation, the extending unit 112 may be bent from the base unit 111 toward the top plate 120.

In an implementation, the terminal cover 110 may include the roughly square- or rectangular-shaped base unit 111 and first to fourth extending units 112a, 112b, 112c, and 112d bent from respective sides of the base unit 111. The first to fourth extending units 112a, 112b, 112c, and 112d may be separated from each other. The first and third extending units 112a and 112c may face each other, and the second and fourth extending units 112b and 112d may face each other.

A slit 111a may be provided in the base unit 111. For example, the slit 111a may have a polygonal shape. In an implementation, the release 113 may include the slit 111a. The slit 111a may have a concave shape with a concavity facing the extending unit 112.

The base unit 111 may include at least one of the releases 113. One end the release 113 may be connected to the extending units 112, and another end of the release 113 may be separated from an interior of the base unit 111 by the slit 111a. In the terminal cover 110, a coupling protrusion 115 may be provided on the extending unit 112, e.g., on an inner surface of the extending unit 112. A coupling groove 125 may be provided on, e.g., an outer surface of, the barrier rib 122 of the top plate 120 to correspond to the coupling protrusion 115. In an implementation, the base unit 111 may include a pair of releases 113 on opposite ends of the base unit 111. The extending unit 112 may include a pair of coupling extending units 112a, 112c coupled with the barrier rib 122 and being connected to respective ones of the pair of releases 113.

The base unit 111 may include a plurality of releases 113 facing each other and respectively connected to the first and third extending units 112a and 112c. In addition, the coupling protrusion 115 may be on the first and third extending units 112a and 112c. The terminal cover 110 may be arranged in one direction so that the first and third extending units 112a and 112c of an adjacent terminal cover 110 face each other. In an implementation, the extending unit 112 may include a pair of lateral extending units 112b, 112d orthogonal to the coupling extending units 112a, 112c.

A ratio of volume to capacity in a battery cell should be minimized, and a battery module should be firmly fixed so as not to vibrate in response to external shock. In addition, in the battery module, the battery cells may be arranged to be adjacent to each other, and the positive terminals and the negative terminals of the adjacent battery cells may be electrically connected to each other such that the battery module may be used as one power source. Thus, in the terminal connecting member for connecting the positive terminals and the negative terminals of the battery cells, it is possible that a short may be easily generated. Therefore, the terminal unit connecting member of the battery module may insulate adjacent terminal unit connecting members from each other using the top plate and the terminal cover. For example, the battery cells may be arranged to be adjacent to each other, and the battery cells may be made smaller and thinner. Thus, a distance between the adjacent terminal covers may become narrow. Accordingly, in the manufacturing of the battery module, a defect may be generated in a process of attaching and detaching the terminal cover, and it is possible that process efficiency may be deteriorated. The embodiments provide a battery module in which the terminal cover may be firmly fixed to the top plate and the terminal cover may be easily attached and detached.

As illustrated in the drawings, terminal covers 110 may be arranged on the top plate 120 of the battery module 100 in one direction, and a distance between adjacent terminal covers 110 may be determined by a thickness of the battery cell 10. For example, the distance between the terminal covers 110 may become smaller as the thickness of the battery cell 10 is smaller. Thus, it is possible that a defect rate in attaching the terminal covers 110 to the top plate 120 and of detaching the terminal covers 110 from the top plate 120 may be increased and may be important when the terminal covers 110 are firmly fixed to the top plate 120.

The terminal cover 110 may include the release 113 and may be coupled with the barrier rib 122 of the top plate 120. The release 113 may be pressed to reciprocate and may be coupled with the first extending unit 112a and the third extending unit 112c. In addition, the coupling protrusion 115 may be on the first and second extending units 112a and 112c, and the coupling groove 125 may be on the barrier rib 122 of the top plate 120 to be coupled with the coupling protrusion 115.

The terminal cover 110 and the barrier rib 122 may be attached and detached to be coupled with each other using the principle of a lever. For example, the release 113 of the terminal cover 110 may be pressed so that the first extending unit 112a and/or the third extending unit 112c are moved outward to be separated from the barrier ribs 122. Thus, the terminal covers 110 may be easily coupled with and uncoupled from the barrier ribs 122.

For example, the coupling protrusion 115 and the coupling groove 125 may be coupled by a hook combination. The coupling protrusion 115 may include a hook edge 115a that protrudes toward the barrier rib 122. For example, the hook edge 115a may extend perpendicularly from the extending unit 112. The coupling groove 125 may include a hook groove 125a corresponding to the hook edge 115a of the coupling protrusion 115 to be fastened or coupled by the hook combination. In an implementation, a depth (t) of the hook groove 125a may be larger than a length (s) of the hook edge 115a. Thus, allowance for the movement of the coupling protrusion 115 may be provided, and fastening or coupling the coupling protrusion 115 and the coupling groove 125 may be facilitated.

The terminal cover 110 may include at least one reinforcing rib 116 on an inner surface thereof. The reinforcing rib 116 may protrude where the terminal cover 110 is bent while connecting the release 113 and the extending unit 112. The barrier rib 122 may include a reinforcing rib groove 126 to accommodate the reinforcing rib 116. In an implementation, the reinforcing rib may extend between the release 113 and the extending unit 112.

The terminal cover 110 may be attached and detached by pressing the release 113 to reciprocate. When the reciprocating is performed a plurality of times, the reinforcing rib 116 may help prevent generation of a crack in the release 113 and may help prevent the release 113 from falling apart. In addition, even if the release 113 is adjacent to the bent parts of the terminal cover 110, durability may be maintained. Therefore, the reinforcing rib 116 may connect the release 113 to the extending units 112 in the terminal cover 110 to help compensate for or improve the durability of the release 113.

In addition, the terminal cover 110 may further include at least one through hole 114 corresponding to the terminal units 11 and 12. The through hole 114 may function as a channel through which wires (connected to the terminal units 11 and 12) may pass. In order to effectively use the battery module 100, a state of the current or voltage of the battery cell 10 may be controlled. Thus, wires for sensing the battery cell 10 may be used, and the wires may be firmly coupled with the terminal units 11 and 12 of the battery cell 10 through the through holes 114. For example, the through hole may overlie the terminals 11, 12 connected by the connecting member 15.

Hereinafter, other embodiments will be described with reference to FIGS. 5 to 6C. The present embodiment is similar to the previous embodiment described with reference to FIGS. 1 to 4C. Therefore, repeated detailed descriptions of like elements may be omitted.

Figure 5:
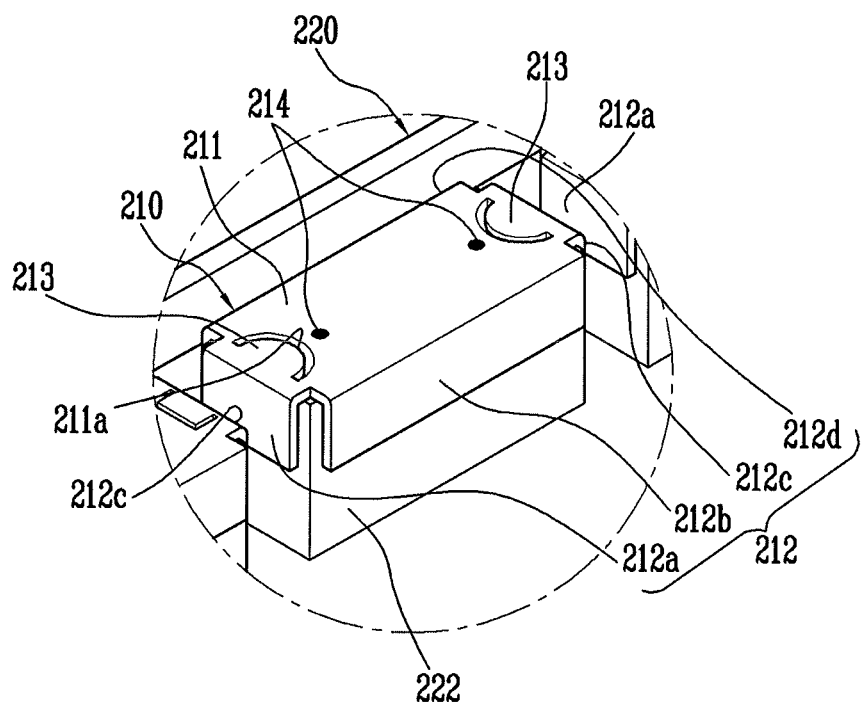
FIG. 5 illustrates a perspective view of a terminal cover and a top plate of a battery module according to another embodiment.

FIG. 5 illustrates a perspective view of a terminal cover and a top plate of a battery module according to another embodiment.

Referring to FIG. 5, a battery module may include a top plate 220 including an opening through which a terminal unit of a battery cell may pass. In addition, the top plate 220 may include at least one barrier rib 212 (surrounding side surfaces of the terminal unit protruding through the opening). A terminal cover 210 may correspond to and/or cover the opening. In an implementation, the terminal cover 210 may be fastened to or coupled with the barrier rib 212.

The terminal cover 210 may include a base unit 211 and an extending unit 212 bent from the base unit 211 toward the top plate 220. In addition, at least one reciprocating release 213 may be provided in the base unit 211. One end the release 213 may be coupled with or connected to the extending unit 212, and another end of the release 213 may be separated from the inside of the base unit 211 by a slit 211a. For example, the slit 211a may have a semi-circular or arc shape. Accordingly, the release 213 may be easily pressed, and a design of the outer appearance of the battery module may be effectively changed.

Figure 6A:
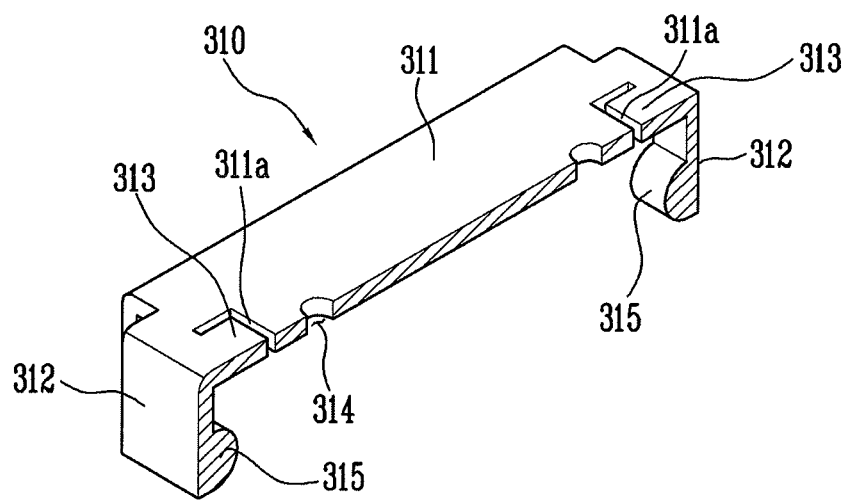
FIG. 6A illustrates a partial perspective view of a terminal cover of a battery module according to yet another embodiment.
Figure 6B:
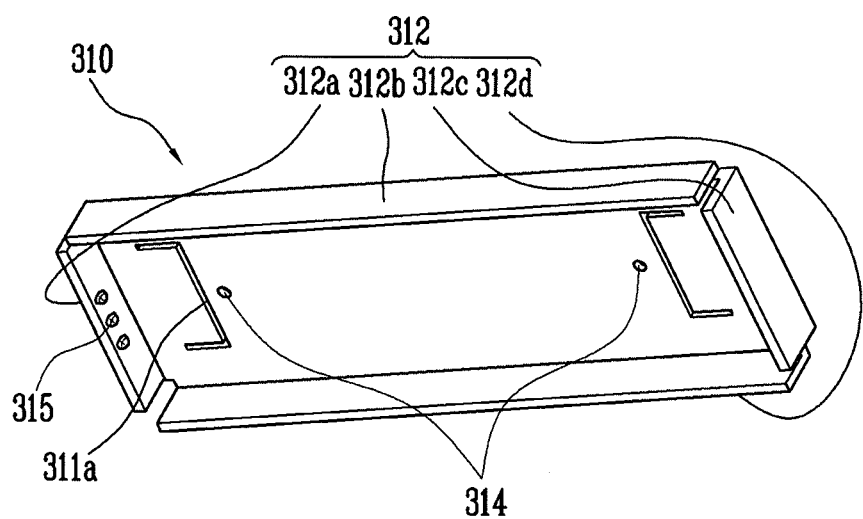
FIG. 6B illustrates a perspective view of an inside of a terminal cover of the battery module of FIG. 5.

FIG. 6A illustrates a partial perspective view of a terminal cover of a battery module according to yet another embodiment. FIG. 6B illustrates a perspective view of an inside of a terminal cover of the battery module of FIG. 5. FIG. 6C illustrates a partial sectional view of the terminal cover of FIG. 6B.

Figure 6C:
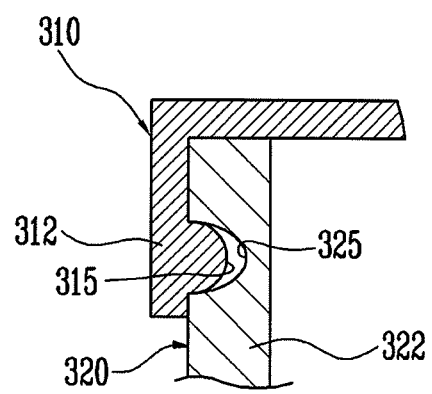
FIG. 6C illustrates a partial sectional view of the terminal cover of FIG. 6B.

Referring to FIGS. 6A, 6B, and 6C, a battery module may include a top plate 320 (including an opening for exposing a terminal unit) and a terminal cover 310 corresponding to or covering the opening. The top plate 320 may include at least one barrier rib 322 protruding around the opening to be coupled with the terminal cover 310. The terminal cover 310 may include a base unit 311 and extending units 312 bent from the base unit 311 toward the top plate 320 to be coupled with the barrier ribs 322.

The terminal cover 310 may include at least one coupling protrusion 315, e.g., a coupling bump, on the extending units 312. At least one coupling groove 325, e.g., a coupling hole, may be provided on the barrier ribs 322 of the top plate 320 to correspond to the at least one coupling protrusion 315. For example, the coupling protrusion 315 may include at least one rounded or hemispherical protrusion, and the coupling groove 325 may include a hole or groove corresponding to the at least one protrusion. The coupling protrusion 315 may include a plurality of protrusions so that the coupling protrusion 315 and coupling groove 325 may be easily coupled and that productivity of the battery module may be improved.

The embodiments provide a battery module that is firmly fixed so as not to vibrate (in response to external shock) and in which productivity is improved. For example, the embodiments provide a battery module having improved stiffness and resistance against external shock.

The embodiments provide a battery module capable of being easily manufactured using new members.

The embodiments also provide a battery module having reduced production costs and improved process efficiency.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A battery module, comprising:
   a plurality of battery cells, each of the battery cells including a terminal such that the plurality of battery cells provide a plurality of terminals, wherein a terminal of one of the battery cells is connected to a terminal of an adjacent battery cell with a connecting member;
   a top plate on the plurality of battery cells, the top plate including:
      an opening corresponding to a position of the terminals connected by the connecting member such that the terminals connected by the connecting member extend therethrough, and
      a barrier rib adjacent to the opening and the terminals connected by the connecting member, and
   a terminal cover detachably covering the opening of the top plate, the terminal cover including:
      a base unit overlying the opening, and
      an extending unit extending from the base unit and being detachably coupled with the barrier rib, and
      a release that selectively detaches the terminal cover from the top plate, the release including a slit and the slit having a concave shape with a concavity facing the extending unit.

2. The battery module as claimed in claim 1, wherein the barrier rib surrounds the opening.

3. The battery module as claimed in claim 1, wherein:
   the extending unit includes a coupling protrusion thereon,
   the barrier rib includes a coupling groove thereon, and
   the coupling protrusion is detachably coupled with the coupling groove.

4. The battery module as claimed in claim 3, wherein:
   the coupling protrusion includes a hook edge extending perpendicularly from the extending unit,
   the coupling groove includes a hook groove parallel with the hook edge, and
   the hook edge is coupled with the hook groove.

5. The battery module as claimed in claim 4, wherein:
   the hook edge has a length,
   the hook groove has a depth,
   and the depth of the hook groove is greater than the length of the hook edge.

6. The battery module as claimed in claim 3, wherein:
   the coupling protrusion includes at least one coupling bump,
   the coupling groove includes at least one coupling hole, and
   the at least one coupling bump is coupled with the at least one coupling hole.

7. The battery module as claimed in claim 1, wherein the terminal cover includes a pair of releases, the pair of releases being disposed on opposite ends of the base unit.

8. The battery module as claimed in claim 7, wherein the extending unit includes a pair of coupling extending units coupled with the barrier rib, the pair of coupling extending units being connected to respective ones of the pair of releases.

9. The battery module as claimed in claim 8, wherein the extending unit further includes a pair of lateral extending units orthogonal to the coupling extending units.

10. The battery module as claimed in claim 1, wherein the concave shape is a polygonal shape.

11. The battery module as claimed in claim 1, wherein the concave shape is an arc shape.

12. The battery module as claimed in claim 1, wherein the base unit has a rectangular shape.

13. The battery module as claimed in claim 1, wherein the terminal cover includes a reinforcing rib on an inner surface thereof, the reinforcing rib extending between the release and the extending unit.

14. The battery module as claimed in claim 13, wherein the barrier rib includes a reinforcing rib groove, the reinforcing rib groove accommodating the reinforcing rib.

15. The battery module as claimed in claim 1, wherein the release selectively detaches the terminal cover from the top plate in response to a predetermined pressure applied to the release.

16. The battery module as claimed in claim 1, wherein the terminal cover includes a plurality of through holes therethrough, the through holes overlying the terminals connected by the connecting member.

17. The battery module as claimed in claim 1, wherein the plurality of battery cells are connected in series.

* * * * *